United States Patent [19]
Baker et al.

[11] Patent Number: 5,212,787
[45] Date of Patent: May 18, 1993

[54] METHOD AND APPARATUS FOR ACCESSING A RELATIONAL DATABASE WITHOUT EXITING AN OBJECT-ORIENTED ENVIRONMENT

[75] Inventors: Ronald B. Baker, Fort Worth; Cathy J. Cavendish, Dallas, both of Tex.; Kevin L. Sitze, Las Cruces, N. Mex.

[73] Assignee: International Business Machines Corporation, Armonk, N.Y.

[21] Appl. No.: 668,001

[22] Filed: Mar. 12, 1991

[51] Int. Cl.$^5$ .................................................. G06F 15/40
[52] U.S. Cl. ........................... 395/600; 364/DIG. 1; 364/283.4
[58] Field of Search .................. 364/DIG. 1, DIG. 2; 395/600

[56] References Cited
U.S. PATENT DOCUMENTS 4,930,071  5/1990  Tou et al. ..................... 364/DIG. 1

Primary Examiner—Thomas M. Heckler
Attorney, Agent, or Firm—Duke W. Yee; Andrew J. Dillon

[57] ABSTRACT

The method and apparatus of the present invention permit accessing a relational database outside of an object-oriented environment without exiting the object-oriented environment. A requestor object located in the object-oriented environment sends a data access message requesting data located in a relational database outside of the object-oriented environment. This message is sent to an interface which creates a data object containing instance variables to hold results from the data access request. The interface executes a data access routine and the results are placed into the data object with the results being sent to the requestor object by sending the requestor object a pointer to the data object.

5 Claims, 3 Drawing Sheets

METHOD AND APPARATUS FOR ACCESSING A RELATIONAL DATABASE WITHOUT EXITING AN OBJECT-ORIENTED ENVIRONMENT

BACKGROUND OF THE INVENTION

1. Field of the Invention:

The present invention relates in general to an improved data retrieval system and in particular to a method and system for retrieving data from a relational database outside of an object-oriented environment. Still more particularly, the present invention relates to a method and system for data retrieval without exiting the object-oriented environment.

2. Description of the Prior Art:

Object-oriented languages confer the benefits of extendibility and reusable code, but in an object-oriented environment, situations exist in which accessing data in a relational database outside of the environment is desirable. At this point in time, object-oriented databases are being researched and developed in which an existing relational database is redesigned and rewritten as an object-oriented database, but large amounts of data in the modern electronic office environment are contained in already existing relational databases. In such situations, a need may exist to access data in these relational databases without exiting the object-oriented environment. Unfortunately, at the present time no system exists in a true object-oriented environment to retrieve data from a relational database without exiting the environment. Presently, individuals working in an object-oriented environment must exit the environment to access data using traditional relational database access techniques.

An object in an object-oriented environment is consists of related pieces of code and data. An object has a library of methods which are essentially unique to an object giving an object its specific behaviors. The class of an object defines a grouping based on one or more properties, and an instance is a single item in a class. For example, a class of an object could be considered as analogous to professions, i.e. lawyers doctors, engineers, and programmers, with an instance of an object being analogous to a particular individual in a class.

A class defines methods for constructing new instances and also instance methods which define how an instance behaves and reacts to incoming messages. The instance variables define the particular features of an instance of an object such as an individual's salary. These instance variables may be defined or may be empty awaiting definition. An instance's data structure is described by its collection of instance variables. Pointers are used to point to a structure in object form.

Smalltalk-80 uses a Model-View-Controller scheme for structuring an application. Model objects derive and manipulate data, while view objects are responsible for screen presentation and user interaction. The view objects govern the application flow and send messages to model objects to retrieve or modify data. The controller manages input and output signals from external devices.

A basic incompatibility exists between object-oriented environments and relational databases. Object-oriented environments are rich with pointers pointing to data structures, while relational databases are flat in organization. The relationships between data in object-oriented environments are therefore built in to the structure of data objects. Since relational databases use a flat, table oriented approach to data storage, these relationships are not made explicit as part of the data storage technique. This makes it difficult for data stored in a relational database to be translated into an object-oriented format.

For example, the Smalltalk V/PM language, a product of Digitalk, Inc., does not support direct access to external relational databases. It does, however, allow OS/2 Dynamic Link Library ("DLL") routines to be invoked and parameters passed to them. Unfortunately, only a single value may be returned from the routine, generally a half word integer or a pointer. Since a return must point to a structure in object form, this restriction makes it difficult to return multiple column values for a row and assign them directly into instance variables.

C++ allows retrieval of data from a relational database through direct access to a C program, but is an extension to C for object-oriented programming. It adds the structure "class" to C but primarily centers on improvements to the C language. C++ is a hybrid language and not a true object-oriented language. In C++, the concept of environment is not the same as in Smalltalk where every message uses dynamic binding.

Therefore, it should be apparent that a method and system is needed to access data in a relational database without the user having to exit the object-oriented environment would be desirable.

SUMMARY OF THE INVENTION

It is therefore one object of the present invention to provide an improved data access system.

It is another object of the present invention to provide a method and system for accessing data in a relational database outside the object-oriented environment.

It is yet another object of the present invention to provide a method and system for accessing data in a relational database without exiting the object-oriented environment.

Additional objects, features and advantages will be apparent in the written description which follows. The method and apparatus of the present invention permits accessing a relational database outside of an object-oriented environment without exiting the object-oriented environment. A requestor object located in the object-oriented environment sends a data access message requesting data located in a relational database outside of the object-oriented environment. This message is sent to an interface which creates a data object containing instance variables to hold results from the data access request. The interface executes a data access routine that accesses data from a relational database and the results are placed into the data object with the results being sent to the requestor object by sending the requestor object a pointer to the data object.

BRIEF DESCRIPTION OF THE DRAWINGS

The novel features characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
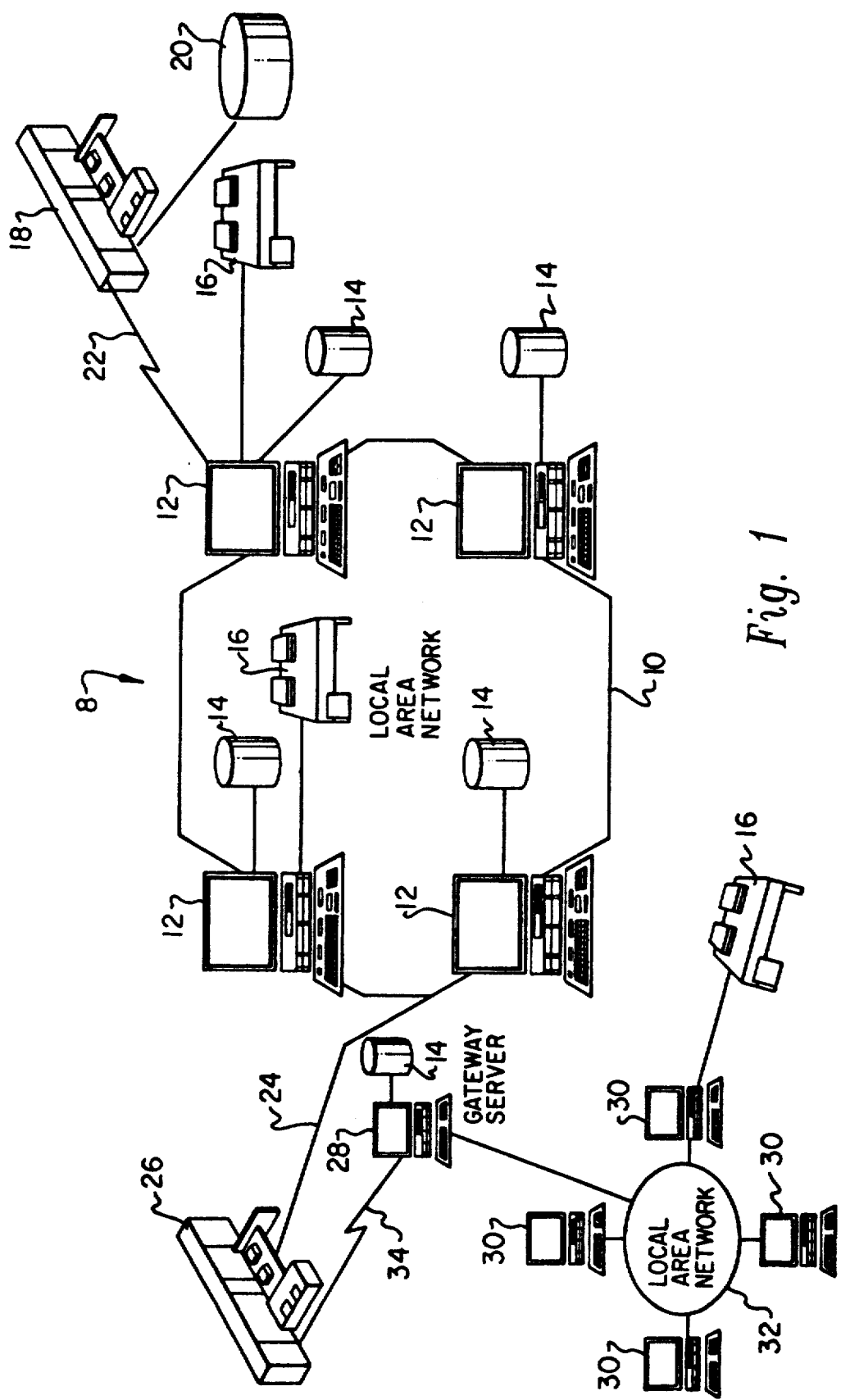
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

Within the distributed data processing system 8, individuals can run different programs on the individual computers 12 and 30 and access other areas of the distributed data processing system 8. For example, one individual may use an object-oriented environment and desire to access a relational database located on a mainframe computer 18 or in storage devices 14, 20 in various locations.

A problem exists with accessing a relational database from an object-oriented environment because of the difference in the organization and structure of data. A specific application is described below as it applies to a particular object-oriented environment.

Figure 2:
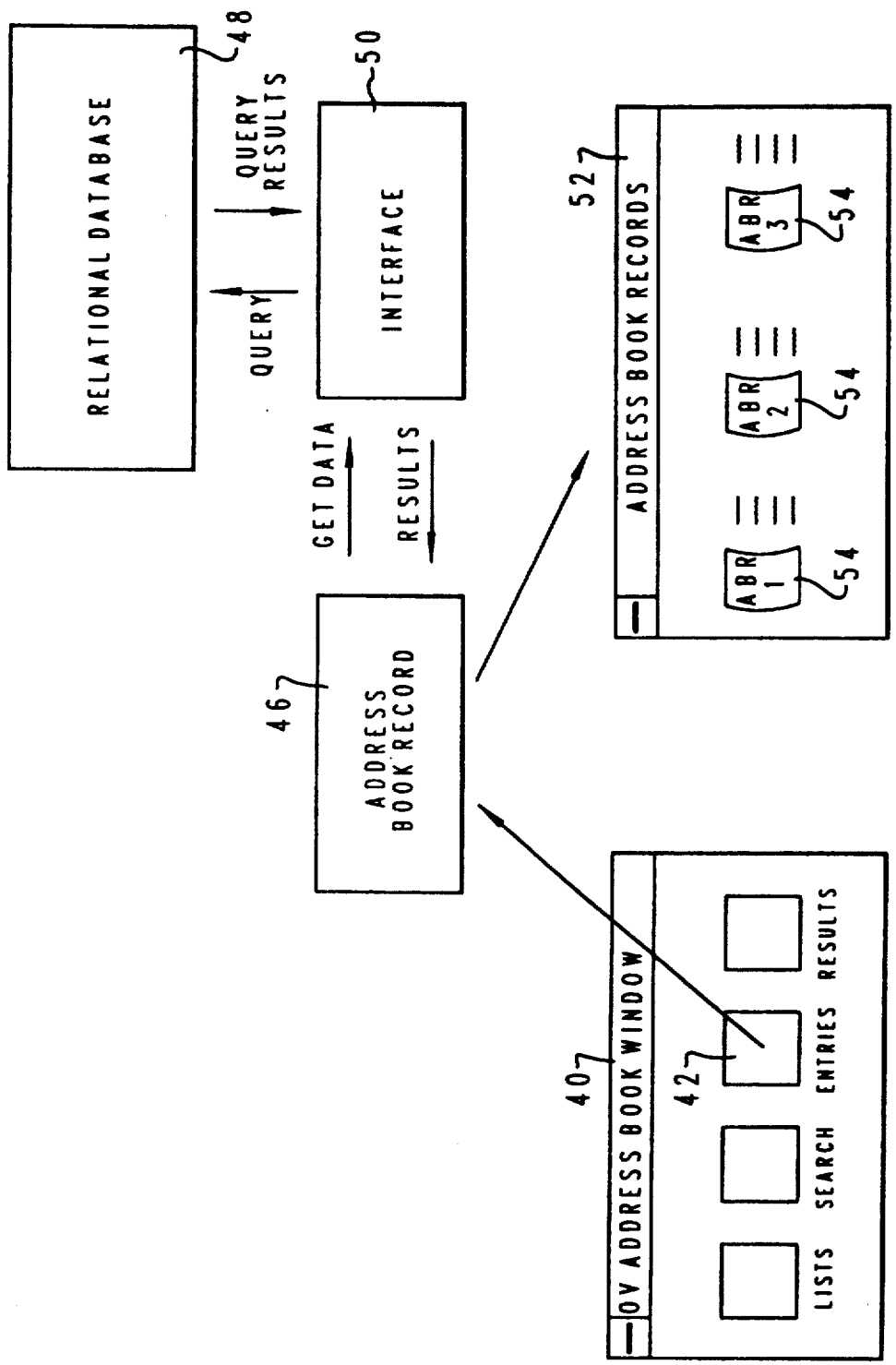
FIG. 2 is a diagram depicting the method of retrieving data from a relational database in accordance with the method of the present invention.

Referring now to FIG. 2, a diagram of a preferred method for accessing a relational database without the user having to exit an object-oriented environment is depicted. One object-oriented environment which would be suitable for use with the preferred embodiment is Office Vision, a product of International Business Machines Corporation. As illustrated, a distributed data processing system 8 is depicted as including an object-oriented environment containing an Address Book window 40. The Address Book window 40 is an object within the object-oriented environment. When a user selects an entries icon 42, an Address Book Records window 52 is opened. The Address Book Records window 52 contains address book record entries 54 from a relational database 48.

The user of the Address Book window 40 does not see the interaction between the requestor object, Address Book Record 46, the interface object 50, and the relational database 48. Address Book Record 46 is a requestor object that sends a message to get data to the interface object 50. The interface object 50 translates the request into a query that is sent to the relational database and receives the query results in return. Next, the interface object 50 translates the query results in a format recognizable by the requestor object, Address Book Record 46. The interface object 50 passes a pointer, containing the location of the requested data, to Address Book Record 46. Address Book Record 46 then displays the results returned from the interface object 50.

Figure 3:
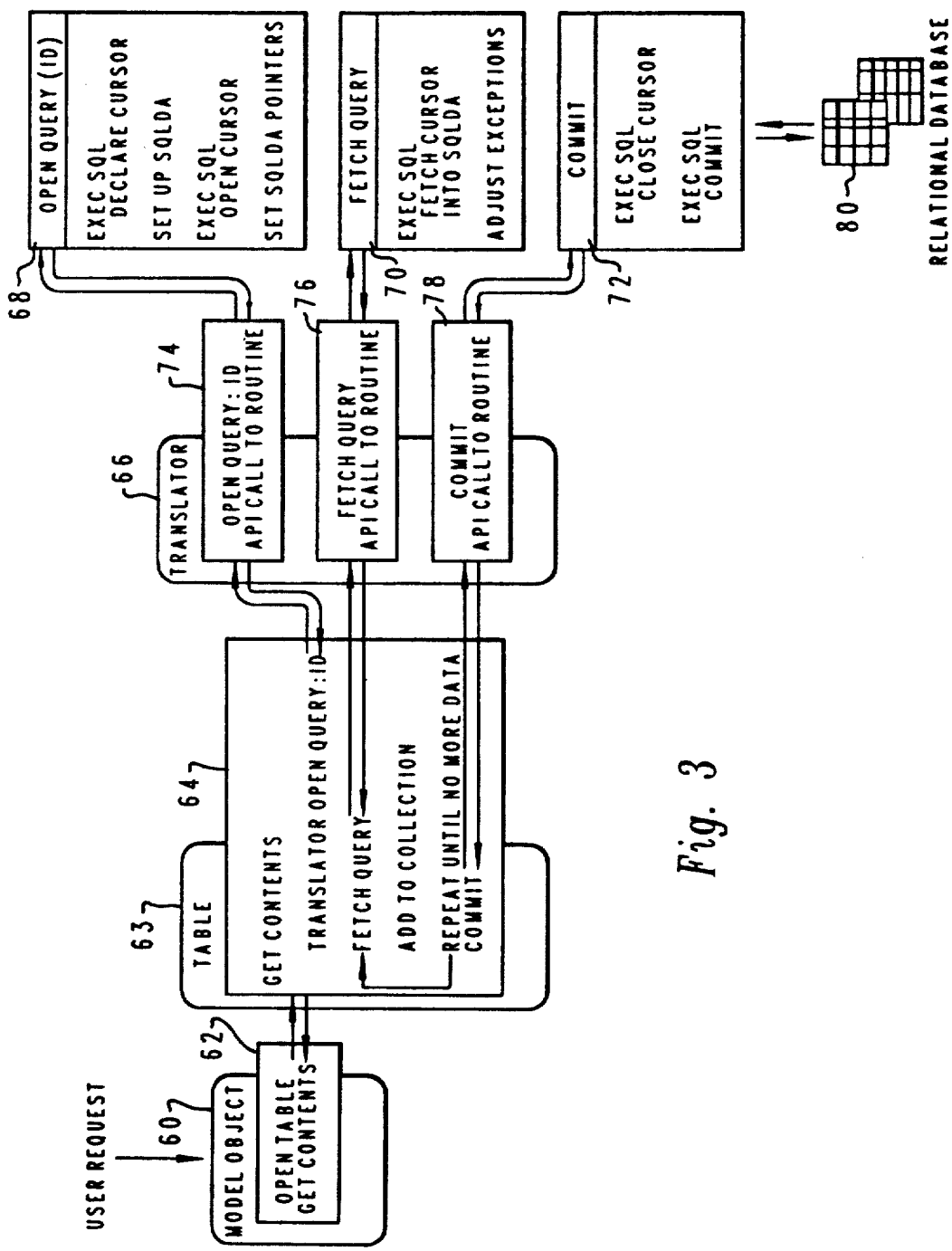
FIG. 3 is a diagram depicting retrieval of data from a relational database in Smalltalk V/PM.

FIG. 3 is a diagram demonstrating a preferred embodiment of the invention involving the object-oriented language, Smalltalk V/PM, and a relational database using structured query language ("SQL"), a well known language for querying relational databases.

In this embodiment, the interface 50 is comprised of Table Object 63, Translator Object 66, open Query routine 68, fetch Query routine 70, and commit routine 72. Table Object 63 creates the data object, and open Query routine 68, fetch Query routine 70, and commit routine 72 comprise the data access routines used to access the relational database 80 and place data into data objects. Each data object preferably corresponds to and contains the data from one row of the relational database. The Translator Object 66 contains Dynamic Link Libraries ("DLL") and makes Application Program Interface ("API") calls to the appropriate data access routines.

As known in the art, multiple rows of the relational database may match a single query. Each row which matches the query corresponds to one data object. Pointers to the data objects are grouped into a collection, and Table Object 63 returns a pointer to the collection to the Requestor Object 60. The collection can be, for example, an array or a linked list of pointers, with the collection being returned by returning a pointer to the array or the head of the linked list.

In response to a request by a user, Model Object 60, which is the requestor object in this particular embodiment and corresponds to the Address Book Record 46 in FIG. 2, executes a method, Open 62, that invokes an object, Table Object 63, and sends the message, "get Contents" to Table Object 63.

As a result, Table Object 63 creates a data object containing instance variables that can be passed to the data access routines for assignment of the instance variables. The data object created by Table Object 63 contains instance variables in the same order as the columns from which data is retrieved by the data access routines, open Query routine 68, fetch Query routine 70, commit routine 72. Table Object 63 executes a method, get Contents 64, that invokes Translator Object 66 and sends a message, "open Query", and passes a parameter or pointer to the data object.

Translator Object 66 executes a method, open Query 74, that sends an Application Program Interface ("API") call to open Query routine 68 along with the parameter or pointer to a data object, resulting in the open Query routine 68 setting up a structured query language data area ("SQLDA") and SQLDA pointers. The SQLDA is set up by passing a parameter or starting pointer to the open Query routine 68 up. The SQLDA basically tells the relational database 80 where to put data. Afterwards, the open Query routine 68 sends a message to Translator Object 66 that the SQLDA and the SQLDA pointers have been setup. This message is sent to Table Object 63 and get Contents 64 sends a message, "fetch Query", to Translator Object 66. Translator Object 66 invokes a method, fetch Query 76, sending an API call to a fetch Query routine 70. The fetch Query routine 70 returns a row of data to the data object created by Translator Object 66. The fetch Query routine 70 preferably iterates through the columns of the SQLDA in the same order as the data object's instance variables. Table Object 63 contains different tables for retrieving different types of data or data in a different order. Each table has a set of data access routines configured to retrieve the particular data in the order set by a particular table.

After a data object's instance variables have been filled, the data object's pointer is added to a collection containing pointers to the data objects. The method, get Contents 64, continues to loop and invoke Translator Object 66 until it receives a message that no more data is left to be retrieved. When fetch Query routine 76 sends a message to Translator Object 66 that there is no more data to be retrieved, this message is sent to Table Object 63.

In response to the no more data message, Translator Object 66 sends a message, "commit", to Translator Object 66, resulting in the execution of a method, commit 78, which sends an API call to a commit routine 72, which return closes up the relational database 80. Afterwards, Translator Object 66 receives a message that the relational database 80 has been closed and relays the message to Table Object 63. Finally, the collection of data objects are sent to Model Object 60 by sending a pointer to the collection to the Model Object 60.

Table Object 63 may have a plurality of tables, each table having a set of data access routines used to correctly place data into data objects. For example, if the Model Object 60 is an address book and requests data in the order last name, first name, and telephone number, Table Object 63 will invoke a table that calls a set of data access routines that retrieves the particular data in the order requested by the Model Object 60. If Model Object 60 requests data in the order last name, first name, telephone number, Table Object 63 would use a second table that invokes a second set of data access routines that retrieves data in the requested order. Thus, for changes in the order or data retrieved, a different table in the Table Object 63 and a different set of data access routines are used.

The embodiments presented are merely illustrative of the invention and is not intended as limitations to the invention. For example, in the embodiment illustrated in FIG. 3, other methods of returning the data objects to the requestor object may be used in addition to returning pointers to the data objects. Furthermore, the requestor object could create and fill the data objects, thus eliminating the need for the Table Object 63. Furthermore, Table Object 63 and Translator Object 66 could be combined into one object under the present invention.

The data access routines may be made more flexible to permit a change in order of data retrieved by sending parameters to the data access routines directing the routine as to where the data should be placed. For example, a data access routine may retrieve a first name, a second name, and a telephone number. The user may desire to have the data in the order of last name, first name, telephone number or first name, last name, telephone number. Changing the order that data is placed in a data object may be accomplished by having a table for each order in the Table Object 63. By passing parameters to the data access routine, one table in the Table Object 63 would cause the first name to be placed first. A second table in the Table Object 63 would send a different set of parameters causing the last name to be placed first in the data object. Thus, if the order first name, last name, telephone number or desired, then the table associated with that particular order would be invoked.

Increased flexibility may also be accomplished by using data access routines that retrieves all the columns in a relational database. By passing parameters to the data access routines indicating which columns should be placed in the data object and in what order the selected columns should be placed in the data object, various combinations of data and ordering can be made possible by using different tables in a Table Object 63 and one data access routine for a relational database.

For example, a relational database contains name, telephone number, and address. Sometimes, a user may want to make telephone calls and desire only to retrieve a name and a telephone number. Other times, a user may be mailing documents and desire to retrieve name and address, but not a telephone number. For each situation, a table in the Table Object 63 is used to pass parameters to the data access routine, directing the routine as to what data is to be placed in the data object and in what order. This allows the personalization of data retrieval through setting up tables in the Table Object 63 for the particular format desired without having to create a new set of data access routines. Thus, a single data access routine for a particular relational database could be used by many users.

The embodiment illustrated illustrates the reading of data, but the present invention may also be used to modify data, change, or add data. To modify data under the embodiment illustrated in FIG. 3, the fetch Query 76 method would not be needed in Translator Object 66, and the open Query 74 method would include more parameters identifying such information as what data is to be changed or added to the relational database 80.

While the invention has been shown particularly shown and described with reference to a preferred embodiment, it will be understood by those skilled in the art that various changes and modifications in form and detail may be made without departing from the spirit and the scope of the invention.

What is claimed is:

1. A method for accessing a relational database outside of an object-oriented environment, without exiting the object-oriented environment comprising:
   receiving a data access message from a requestor object in the object-oriented environment;
   selecting a table having a data access routine for retrieving data corresponding to the data access message;
   creating a data object in the object-oriented environment for holding data;
   sending a command to a data access routine corresponding to the table, wherein the data access routine accesses the relational database;
   receiving results of the relational database access from the data access routine;
   placing the results in the data object; and
   sending the data object to the requestor object.

2. The method of claim 1 wherein the sending the result step includes sending the requestor object a pointer to the data object.

3. The method of claim 1 wherein the data access routine places the result in the data object.

4. A data processing system for accessing a relational database outside of an object-oriented environment, without exiting the object-oriented environment, the data processing system comprising:
   reception means for receiving a data access message from a requestor object in the object-oriented environment;
   selection means for selecting a table having a data access routine for retrieving data corresponding to the data access message;
   creation means for creating a data object in the object-oriented environment for holding data;
   sending means for sending a command to a data access routine corresponding to the table, wherein the data access routine accesses the relational database;
   reception means for receiving results of the relational database access from the data access routine;
   placement means for placing the results in the data object; and
   means for sending the data object to the requestor object.

5. The data processing system of claim 4, wherein the data access routine for retrieving data is predefined.

* * * * *